United States Patent
O'Connell et al.

(10) Patent No.: US 10,855,758 B1
(45) Date of Patent: Dec. 1, 2020

(54) DECENTRALIZED COMPUTING RESOURCE MANAGEMENT USING DISTRIBUTED LEDGER

(71) Applicant: EMC IP Holding Company LLC, Hopkinton, MA (US)

(72) Inventors: Mark A. O'Connell, Westborough, MA (US); Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 220 days.

(21) Appl. No.: 15/669,499

(22) Filed: Aug. 4, 2017

(51) Int. Cl.
*G06F 21/00* (2013.01)
*H04L 29/08* (2006.01)
*H04L 29/06* (2006.01)
*H04L 9/08* (2006.01)

(52) U.S. Cl.
CPC ........ *H04L 67/1078* (2013.01); *H04L 9/0891* (2013.01); *H04L 63/0428* (2013.01); *H04L 63/065* (2013.01); *H04L 67/1095* (2013.01)

(58) Field of Classification Search
CPC . H04L 9/0891; H04L 63/0428; H04L 63/065; H04L 67/1095
See application file for complete search history.

(56) References Cited

U.S. PATENT DOCUMENTS

| | | | | |
|---|---|---|---|---|
| 2010/0325732 A1* | 12/2010 | Mittal | ................... | G06F 21/604 726/26 |
| 2013/0042111 A1* | 2/2013 | Fiske | ..................... | H04L 9/3239 713/170 |
| 2016/0299918 A1* | 10/2016 | Ford | ..................... | G06F 21/645 |
| 2017/0149748 A1* | 5/2017 | Lindteigen | .......... | H04L 63/0435 |
| 2017/0236094 A1* | 8/2017 | Shah | ..................... | G06Q 10/063 705/300 |
| 2017/0352012 A1* | 12/2017 | Hearn | .................. | G06Q 20/065 |
| 2018/0075527 A1* | 3/2018 | Nagla | ................. | G06F 21/6218 |
| 2018/0181768 A1* | 6/2018 | Leporini | ............. | G06F 21/6209 |
| 2018/0322587 A1* | 11/2018 | Linne | .................... | H04L 9/3236 |

(Continued)

OTHER PUBLICATIONS

M. Ali et al., "Blockstack: A Global Naming and Storage System Secured by Blockchains," Proceedings of the USENIX Annual Technical Conference (USENIX ATC), Jun. 22-24, 2016, pp. 181-194.

(Continued)

*Primary Examiner* — Fatoumata Traore
*Assistant Examiner* — Michael M Lee
(74) *Attorney, Agent, or Firm* — Ryan, Mason & Lewis, LLP (57) ABSTRACT

In a network including a plurality of computing resources associated with an enterprise, an identity is established for each of the computing resources in accordance with a decentralized identity management system maintained in accordance with a distributed ledger. The plurality of computing resources is managed in association with the distributed ledger, wherein managing comprises the enterprise posting one or more commands on the distributed ledger to enable one or more of the plurality of computing resources to obtain the one or more commands. In one non-limiting example, the computing resources are part of a geographically distributed IT infrastructure associated with the enterprise.

20 Claims, 5 Drawing Sheets

(56) References Cited

U.S. PATENT DOCUMENTS

2019/0005258 A1\* 1/2019 Signas ................ G06F 21/6209
2019/0034465 A1\* 1/2019 Shimamura ......... G06F 16/2474
2019/0044917 A1\* 2/2019 Mork .................. H04L 63/0428
2019/0147438 A1\* 5/2019 Micali ................ G06Q 30/0207
                                                          705/71

OTHER PUBLICATIONS

Satoshi Nakamoto, "Bitcoin: A Peer-to-Peer Electronic Cash System," Whitpaper, https://bitcoin.org/bitcoin.pdf, Nov. 2008, 9 pages.

\* cited by examiner

DECENTRALIZED COMPUTING RESOURCE MANAGEMENT USING DISTRIBUTED LEDGER

FIELD

The field relates generally to networks of computing resources, and more particularly to techniques for managing such networks of computing resources.

BACKGROUND

Enterprises such as corporations typically have a large information technology (IT) infrastructure comprising a network of computing resources distributed across a geographic environment. Such computing resources may be diverse in nature including, but not limited to, cloud platforms, data centers, employee devices, customer devices, etc.

Centralized management of such IT infrastructure has been the norm for many decades. However, with increased decentralization of such IT infrastructure, e.g., due to the proliferation of additional computing resources, such as edge devices, gateways, and Internet of Things (IoT) devices, now being part of the IT infrastructure, centralized management has become much more difficult, if not impossible.

SUMMARY

Embodiments of the invention provide systems and methods for decentralized computing resource management using a distributed ledger.

For example, in one embodiment, a method comprises the following steps. In a network comprising a plurality of computing resources associated with an enterprise, an identity is established for each of the computing resources in accordance with a decentralized identity management system maintained in accordance with a distributed ledger. The plurality of computing resources is managed in association with the distributed ledger, wherein managing comprises the enterprise posting one or more commands on the distributed ledger to enable one or more of the plurality of computing resources to obtain the one or more commands.

Advantageously, illustrative embodiments utilize decentralized identity techniques to manage a large number of geographically distributed computing resources in association with a distributed ledger.

These and other features and advantages of the invention will become more readily apparent from the accompanying drawings and the following detailed description.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of such IT infrastructure.

Illustrative embodiments provide techniques for managing a plurality of computing resources associated with a given enterprise using a decentralized identity management system. The term "computing resource," as illustratively used herein, can refer to any device, endpoint, component, element, platform, cloud, data center, storage array, client, server, gateway, or other resource, that is part of an IT infrastructure associated with an enterprise. In one non-limiting example, the decentralized identity management system adapts a Blockstack architecture which will be described below in detail. Before describing such illustrative embodiments, some drawbacks associated with the conventional approach of centralized computing resource management will first be described.

As mentioned above in the background section, centralized management of IT infrastructure has been the norm for many decades. That is, as corporate IT infrastructure has grown over the years, centralized management tools have been able to keep pace with the expansion. For example, specific management software has been used that functioned in a centralized manner. Tools such as EMC Control Center or ECC (Dell EMC, Hopkinton Mass.) kept pace with significant device count growth within the confines of one data center, while management tools such as ViPR Controller and Storage Resource Monitor (Dell EMC, Hopkinton Mass.) were able to provide a degree of centralized management and monitoring for devices that spanned geographies.

The scale of IT, however, has reached a tipping point where these centralized approaches are no longer feasible due to the overwhelming number of geographically dispersed resources. Examples of specific problems related to this phenomenon are described below.

Figure 1:
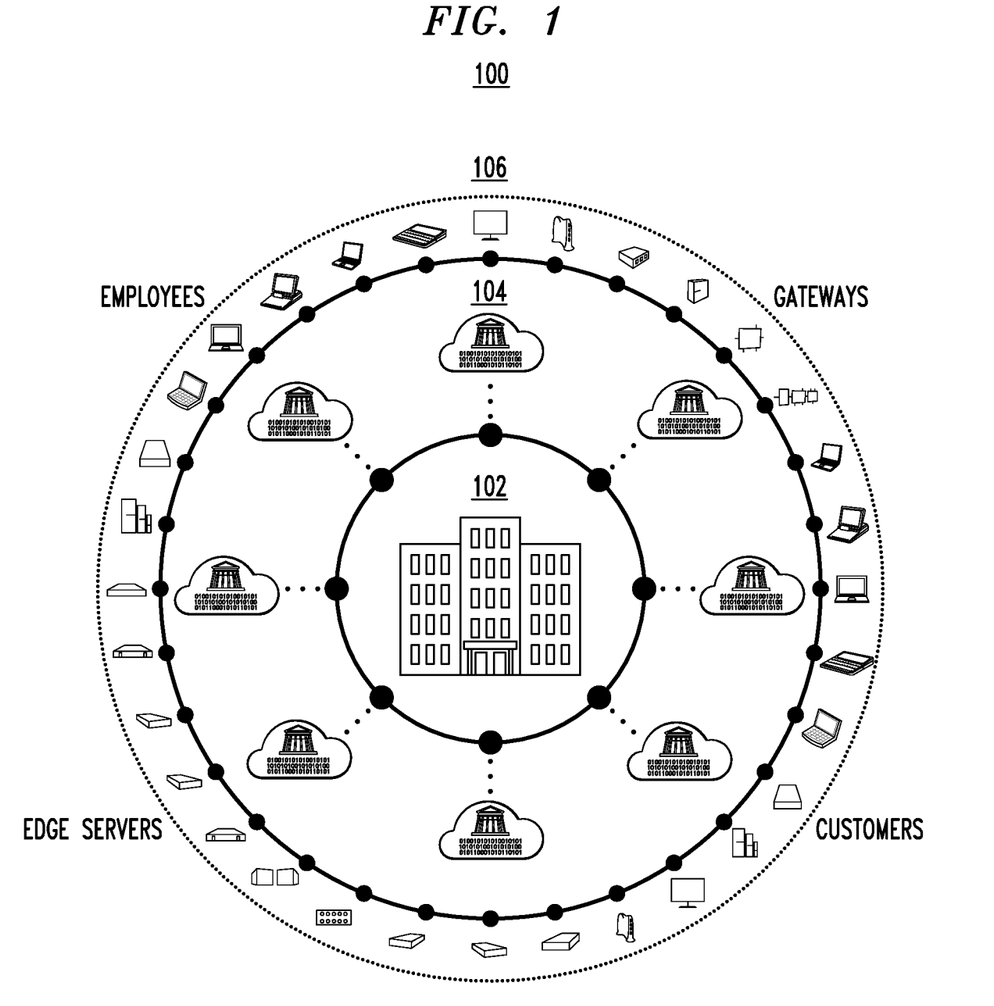
FIG. 1 illustrates a network of computing resources associated with an enterprise with which one or more illustrative embodiments may be implemented.

FIG. 1 illustrates a network 100 of decentralized infrastructure resources associated with an enterprise. More particularly, FIG. 1 highlights a corporation (inner circle 102) attempting to manage infrastructure resources spread not only across multiple clouds (next largest circle 104), but to a wide variety of other corporate devices such as edge devices, gateway devices, and employee/consumer endpoint devices (outermost circle 106).

Note that FIG. 1 does not expressly show potentially millions of IoT devices that ultimately connect back to gateways, devices, and clouds, but which are considered part of the network of computing resources that the corporation wishes to manage. Consider the large set of problems encountered by traditional, centralized management frameworks when applied against these ever-growing computing resource configurations.

When managing a large set of computing resources as shown, for example, in FIG. 1, it is typically necessary to contact each resource individually in order to gather information about the state of the resource and to send commands that will affect the resource. The ability of a centralized management tool to manage thousands (or hundreds of thousands) of such connections is difficult.

For environments where resources experience potentially poor bandwidth on their network connections, information gathering can either take a significant amount of time or fail to complete at all. While gathering the information, it is highly likely that one or more connections will fail, meaning that the information is incomplete, and it is likely that the time taken will render the information stale by the time it is all gathered.

For resources which have intermittent network connectivity, management commands which are sent to the resource may not be received, leaving the resource in a state that is potentially inconsistent with other managed resources.

When a command cannot be delivered to a resource, the management platform must typically track the failure and periodically retry the command. If other, potentially conflicting, management commands are later issued, then the order of arrival of the commands at the resource is uncertain, or the management platform may have to reconcile the commands while lacking sufficient information about the resource and its capabilities to do so.

When the managed resources communicate, either with each other or with a centralized system, any missing management operations (e.g., due to intermittent failures or general timeouts) may result in the resource communicating either incorrect information or communicating the information in an incorrect format. The information may then be discarded as corrupt or, worse, may be misinterpreted and may cause a chain of incorrect actions to occur.

Centralized management frameworks often rely on encrypted or private channels for sending commands. As infrastructure spreads out onto public networks, there is a greater need for secure (e.g. encrypted) management commands.

Illustrative embodiments overcome the above and other drawbacks associated with existing centralized management of IT infrastructure. More particularly, illustrative embodiments provide techniques for managing multiple computing resources using a decentralized identity management system. In an environment that supports decentralized identities, it is possible to use these identities, together with an underlying distributed ledger, to implement a decentralized management methodology for a plurality of heterogeneous computing resources. Illustrative embodiments advantageously allow commands to be sent to (and processed asynchronously by) the resources, but without existing problems incurred by asynchronous communication.

In one or more illustrative embodiments, a decentralized identity management system known as Blockstack is adapted for managing a plurality of computing resources. Blockstack is described in detail, for example, in M. Ali et al., "Blockstack: A Global Naming and Storage System Secured by Blockchains," Proceedings of the 2016 USENIX Annual Technical Conference, p. 181-194, June 2016, the disclosure of which is incorporated by reference herein in its entirety. However, it is to be appreciated that embodiments are not limited to using Blockstack as a decentralized identity management system, and thus embodiments are more generally applicable to any other suitable, non-Blockstack based, decentralized identity management system.

In general, Blockstack uses a blockchain to bind a digital property, such as a name, to a given value. Immutability and therefore trust are provided in a decentralized manner by allowing for any new node in the system to independently verify data bindings through the blockchain. More particularly, a Blockstack architecture has four layers, two in the control plane and two in the data plane. The control plane includes a blockchain layer and a virtualchain layer. The data plane includes a routing layer and a data storage layer.

The blockchain layer is the bottommost functional layer, and serves to store the Blockstack operations (encoded in transactions on the blockchain distributed ledger) and to provide consensus on the order in which the Blockstack operations were written. Blockstack operations typically include name registrations, updates, and transfers.

The virtualchain layer is functionally implemented above the blockchain layer. The virtualchain layer is configured to define new Blockstack operations without changing any data on the blockchain layer. The logic for accepting or rejecting new Blockstack operations is contained in the virtualchain layer.

Above the control plane (blockchain layer and virtualchain layer), the data plane separates the function of routing requests (routing layer) from the function of storing data (data storage layer). More particularly, Blockstack uses zone files (having the same format as a zone file of a domain name service (DNS)) for routing information. The virtualchain layer binds names to respective hashes of the zone files and stores these bindings in the control plane. However, the zone files themselves are stored in the routing layer. The integrity of a given zone file is verified by verifying the hash of the given zone file in the control plane.

The data storage layer is the topmost functional layer in the Blockstack architecture. The actual data values of the name-value pairs are stored in the data storage layer, and are signed by the cryptographic key of the owner of the name. The integrity of a given data value can be verified in the control plane.

Accordingly, the Blockstack architecture uses these four functional layers to implement a naming system. Names are owned by cryptographic addresses of the underlying blockchain layer and their associated private keys. A user claims a name by being the first to perform a successful preorder and register operation for the name. Once a name is registered, a user can update the name-value pair. This is done by initiating an update operation and uploading the new value to the routing layer so as to change the name-value binding. The address that is allowed to sign subsequent transactions can be changed by a name transfer operation. Further details about the Blockstack architecture can be found, for example, in the above-referenced M. Ali et al. paper.

It is to be further understood that, in an illustrative Blockstack architecture, while the blockchain layer is maintained across a first set of distributed compute nodes, the other layers of the Blockstack architecture are maintained across a second set of distributed compute nodes which are in communication with one or more of the blockchain compute nodes.

As used herein, the terms "blockchain," "digital ledger" and "blockchain digital ledger" may be used interchangeably. As is known, the blockchain or digital ledger protocol is implemented via a distributed, decentralized computer network of compute nodes. The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In the Blockstack context, examples of transactions can be operations of preordering a new name-value pair, registering a new name-value pair, and changing an existing name-value pair.

In the case of a "bitcoin" implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a Bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol in a Blockstack naming system and that embodiments of the invention are not limited to the above or any particular blockchain protocol or naming system implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Accordingly, in a Blockstack naming system, one or more compute nodes allow for identities to be created by registering a name and then associating identity information with that name (e.g., as described above, a reference pointer in the blockchain points to a given zone file, and the given zone file ultimately points to information about the user's identity).

For example, assume that an identity for an employee of a company is created by the company using an identification badge number of the employee. The company keeps the private key for that identity and the Blockstack naming system accepts the identity in a two-phase commit ("preorder" command followed by "register" command) where the public key can verify the private key being used by the company. In a similar way, an individual can create an identity himself (using the two-phase commit) that has its own private key, thus creating a decentralized identity that is fully owned and managed by him. The identity is "remembered" across every node in the blockchain distributed ledger due to Blockstack's use of a private scratchpad location in a bitcoin transaction. The replication of each bitcoin transaction into a decentralized blockchain results in a public decentralized identity registry.

Figure 2:
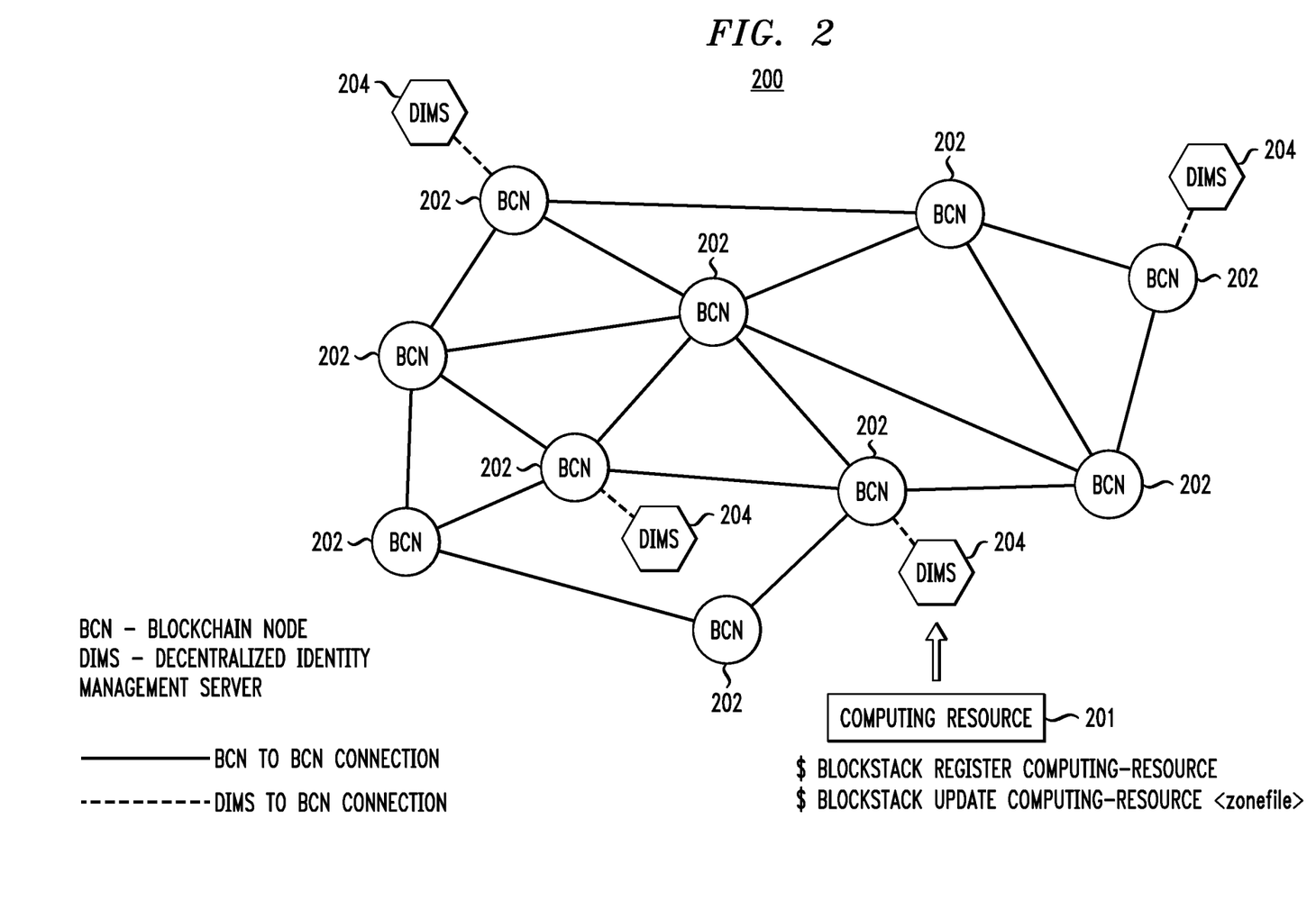
FIG. 2 illustrates a decentralized identity management system for managing a plurality of computing resources, according to an illustrative embodiment.

FIG. 2 illustrates a decentralized identity management system 200 for use in managing a plurality of computing resources according to an illustrative embodiment. As will be explained further herein, each computing resource in an IT infrastructure of an enterprise (e.g., each resource shown or otherwise mentioned above in the context of FIG. 1) has its own identity established through system 200 with a private key known only to the resource and a public key which is well known. While one computing resource, i.e., computing-resource 201, is shown performing register and update operations with respect to system 200, it is to be understood that each computing resource in the IT infrastructure of an enterprise communicates and interacts with system 200 establishing their own decentralized identities.

As further shown, system 200 comprises a first set of compute nodes referred to as blockchain nodes (BCN) 202. Each BCN 202 is operatively coupled to one or more other BCN nodes 202 via a communication connection (as part of a communications network). The system 200 also comprises a second set of compute nodes referred to as decentralized identity management servers (DIMS) 204. In one embodiment, the DIMS are Blockstack nodes. Each DIMS 204 is operatively coupled to at least one BCN 202 via a communication connection (as part of a communications network). Each DIMS may also be connected to one or more other DIMS. The BCN nodes 202 form a blockchain ledger while the DIMSs 204 form the naming system in conjunction with the underlying blockchain distributed ledger. In a Blockstack implementation, the DIMS 204 form what is referred to as the virtualchain layer which logically resides on top of a bitcoin network formed by BCN nodes 202. The routing layer and data storage layer can be part of the DIMS 204, or they can be implemented on different nodes.

Given the configuration of system 200, assume that the enterprise wishes for a given computing resource to register an identity with system 200 as "computing-resource" and that the identity and system 200 will be used to manage the given computing resource as will be further described herein. As shown, the given computing resource registers the identity with the decentralized identity management system 200. The given computing resource can update the identity as well using the update operation. Each computing resource in the IT infrastructure of the enterprise similarly establishes an identity through system 200.

The identity is defined (or otherwise specified) in a profile record (e.g., a token file or token) cryptographically signed by the computing resource. In the context of a Blockstack adaptation, a reference pointer to a zone file is stored in the blockchain, and then the zone file contains a reference pointer to the cryptographically signed token file. Thus, advantageously, the blockchain distributed ledger (e.g., at the blockchain layer) references the cryptographically signed token file (e.g., stored at the data storage layer). The referencing, in this illustrative embodiment, is provided by pointers that provide the connection from the blockchain layer, through the virtualchain layer and the routing layer, to the data storage layer.

More particularly, FIG. 2 illustrates a computing resource ("computing-resource") requesting system 200 to register and create an identity. Note that the identity refers to a zone file. Note also that the zone file, as mentioned above, points to the computing-resource's profile record (e.g., token file or token). This token file, as will be explained further below, can contain one or more commands posted on the blockchain distributed ledger and obtained by the computing-resource 201 that the enterprise uses to manage the computing-resource 201. The token file can also contain status information regarding computing-resource 201 and the one or more commands. It is to be appreciated that, in some embodiments, the computing resource may wish to have more than one token file spread out at different storage locations (e.g., the zone file points to multiple token files).

Figure 3:
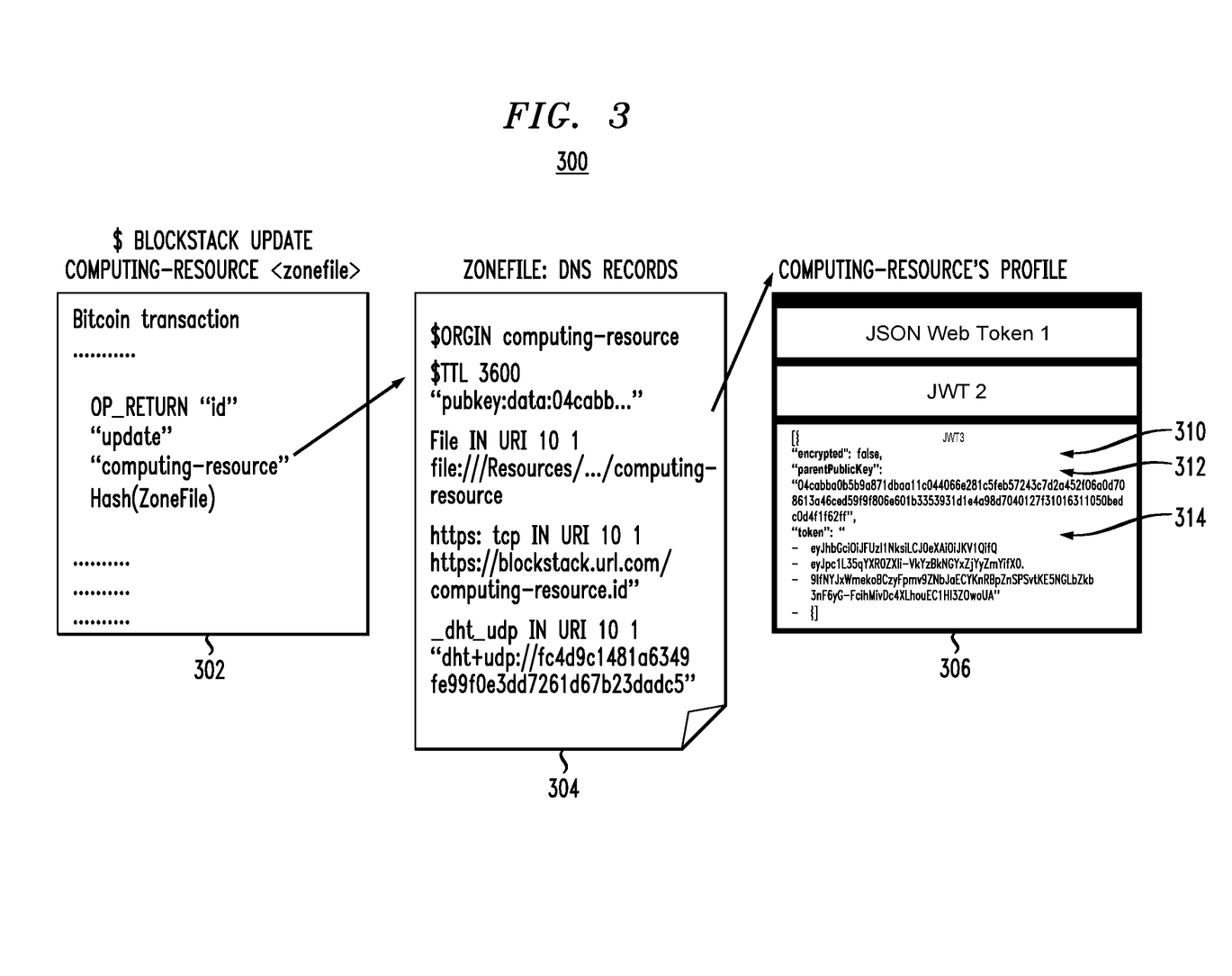
FIG. 3 illustrates a token file for use in a decentralized identity management system for managing a plurality of computing resources, according to an illustrative embodiment.

FIG. 3 illustrates how a decentralized identity can share information or otherwise be managed through the use of an ID, a zone file, and through a token file in the form of a JavaScript Object Notation (JSON) Web Tokens (JWTs). For example, process 300 shows the computing resource ("computing-resource") associating its name with a hash of a zone file (DNS information related to "computing-resource"). This association is timestamped and permanently stored in the blockchain (e.g., Bitcoin) distributed ledger as a transaction (e.g., 302). The zone file (e.g., 304) then highlights the identity of computing-resource by storing token records in a profile (e.g., 306). Profile 306 is an example of a token file which, itself, in this non-limiting example, comprises information sections 310, 312, and 314 that define information such as the identity and the one or more attributes associated with the identity. Information section 310 indicates whether or not the token file itself or any part of the token file is encrypted by a cryptographic key. Information section 312 indicates one or more of the public keys used either to decrypt the information in the token file or to validate the signatures. In general, information is encrypted with a private key (either all the information or just a signature) and decryption via the public key then shows that only the holder of the private key could have generated the information. Information section 314 specifies the identity and the set of attributes associated with the identity. For example, instructions (e.g., commands obtained by the computing resource posted by the enterprise) and other attributes (e.g., status information) may be stored in information section 314 of computing-resource's profile (e.g., token file) 306. As will be further explained below, the enterprise interacts with a decentralized identity management system described herein to manage each computing resource using the blockchain distributed ledger of the decentralized identity management system 200.

The computing-resource 201 controls the ecosystem in FIG. 3 via the use of a private key. Entries in the blockchain distributed ledger are signed with this private key. Every entry stored into the profile can be signed with the same private key (e.g., as a JSON Web Token).

Given the above description of an illustrative system for decentralized computing resource management, illustrative methodologies, functionalities, and use cases will now be described.

Support for Decentralized Identity Groups.

The owner of the computing resources (e.g., enterprise) can establish decentralized identity groups that are based on whatever grouping criteria the owner wishes to establish. Each group possesses an identity, with a public and private key, established through the decentralized identity management system 200. A computing resource may be a member of any number of groups. The groups may be hierarchical, may have overlapping members, or any such organization.

As an example, for a U.S. based company managing IoT devices in manufacturing facilities across the U.S., some groups may include:

(i)<state>-devices, where <state> is one of the 50 states in the U.S.;

(ii)<class-of-device>-devices, where <class-of-device> may represent an internal classification of the device, such as "robotic-installer", "quality-control", "environmental-sensing", etc.;

(iii)<device-manufacturer>-devices, where <device-manufacturer> is the name of the company which produced the device;

(iv)<device-type>-devices, where <device-type> is a product number or some other identifier which identifies a very specific class of products from a manufacturer; and (v)<facility-id>-devices, where <facility-id> is an owner specific designation for a particular facility and this group contains devices located in that particular facility.

Support for Group Keys.

When a computing resource is made a member of a particular group, it obtains an encryption key specific to that group. This may be the private key of that group (simple but not completely secure), or there may be a methodology where the group owner publishes an encryption key in its profile (similarly established via system 200), encrypted first via the private key of the group and then with the public key of the computing resource so that the computing resource can then access the encryption key (from the owner profile via system 200). This guarantees that the encryption key originated from the group and was intended for the specific computing resource.

Encrypted Management Commands Via a Blockchain Distributed Ledger.

Figure 4A:
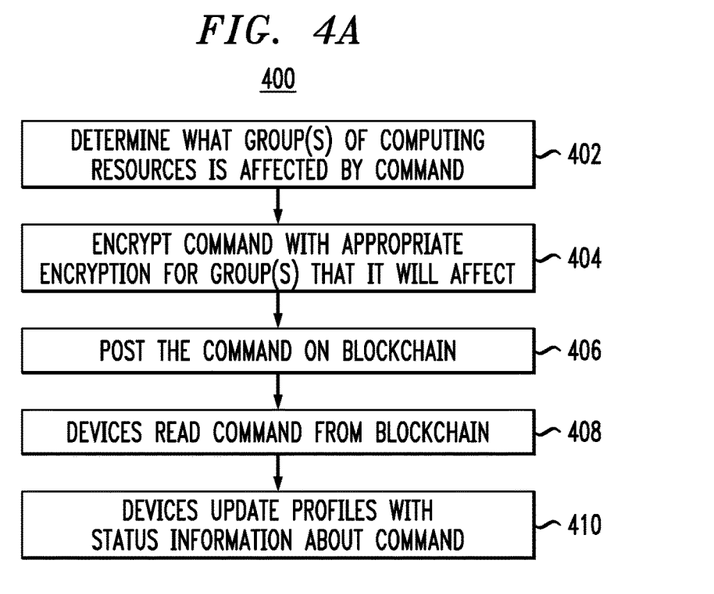
FIGS. 4A through 4D illustrate methodologies for managing a plurality of computing resources using a decentralized identity management system, according to one or more illustrative embodiments.

The above-mentioned encryption key is used to send encrypted management commands for that group. To manage computing resources (using the IoT device group examples mentioned above), the following steps are performed as illustrated in process 400 of FIG. 4A:

Step 402 determines what group(s) of computing resources is affected. By way of example:

(i) To comply with new regulations in a state, apply the command to the <state>-devices group for the appropriate state.

(ii) To update software to fix a defect, apply the command to <device-type>-devices for the very specific devices affected.

(iii) To update quality-control devices within a particular state, apply the command on <class-of-device>-devices (where class-of-device is quality-control) within the appropriate state, via nesting, where the command is encrypted with both keys.

Step 404 encrypts the command with the appropriate encryption for the group(s) that it will affect.

Step 406 posts the command on the blockchain. The record on the blockchain includes a plain-text (publicly readable) indication of what group(s) are affected, followed by the encrypted commands.

Note that steps 402, 404 and 406 above are performed by the enterprise (owner or manager of the devices) in accordance with a device or system (computing resource) that has its own identity (established via system 200) and that can post information on the blockchain (i.e., the distributed ledger that is part of system 200).

In step 408, all the computing resources read the command from the blockchain. If the plain-text group indication indicates that the computing resource in question belongs to one of the groups affected by the command, the computing resource then decrypts the command and processes it.

In step 410, if necessary, the computing resources update their own profiles with status information about the command, e.g., an indication that the computing resource has processed all commands up to offset X in the blockchain.

Support for Multiple Command Types.

A wide variety of commands can be issued to the computing resources using process 400 including, but not limited to:

(i) Software updates, pushed to specific computing resources (e.g., emergency security updates, etc.);

(ii) Changes to reporting frequency;

(iii) Changes to reporting destination, e.g., send results to server X;

(iv) Changes to reporting configuration, e.g., start sampling temperature and report it to server X in Celsius or Fahrenheit.

Support for Public Networks.

In a typical managed environment, the computing resources are typically on a private network to prevent unauthorized users from issuing commands to the resources. By using a blockchain to hold the commands to the computing resources and by using encryption to ensure that the commands are authorized, there is no longer a need for a private network and existing public network infrastructure can be used for management purposes, making management easier to establish initially and also less expensive over time.

Command Sending in Constant Time.

Because the processing of the commands by the computing resources is separated from the issuing of the command, the time necessary to create one or more commands and send them to the blockchain is independent of the number of managed computing resources and the number of computing resources affected by the one or more commands.

Intermittently Connected Computing Resources do not Block Command Sending.

For computing resources with either poor network connectivity, limited bandwidth, or periodically disconnected resources (e.g., cars driving through communication dead zones, airplanes over an ocean, ships far out at sea), the disconnected nature of these computing resources does not prevent management commands from reaching and affecting better connected computing resources.

Furthermore, given the nature of the blockchain, if there are multiple computing resources in such a situation (e.g., a ship at sea), when the ship approaches shore and has connectivity, it is not necessary that each computing resource individually attempt to access a global blockchain. Instead, a single blockchain node on the ship can update itself with all recent blockchain updates, and this single node can then serve as a locally accessible blockchain node for all the on-ship computing resources, thus keeping the majority of the management traffic for the computing resources on the ship local to the ship.

Communication Amongst Computing Resources Synchronized by a Blockchain Offset.

Given that the blockchain provides a globally ordered list of commands, the state of any computing resource on the blockchain can be inferred by specifying a blockchain offset and asserting that all management commands prior to that offset have been processed.

Figure 4B:
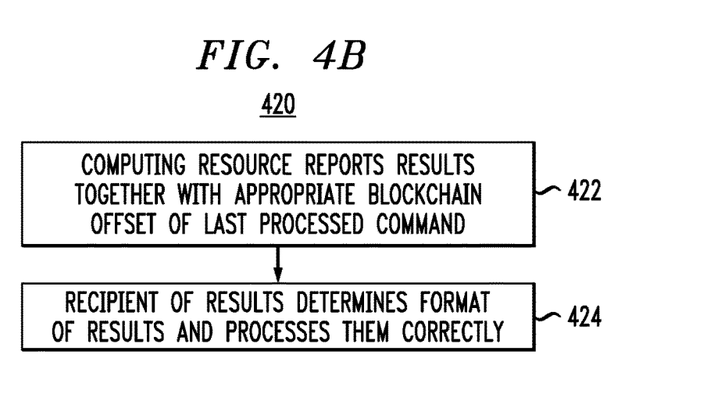

For example, as shown in process 420 of FIG. 4B, when an a frequently disconnected computing resource is reporting results which need to be in a specific format, and the format has been changed recently via a management command, the computing resource report its results together with the appropriate blockchain offset of the last processed command (step 422). The recipient of the results can then unambiguously determine what format the results are in and process them correctly (step 424).

Well-Defined, Ordered Command Processing.

As blockchain provides a global ordering of commands, there is never a question about the order in which a remote computing resource, even one that is periodically disconnected, will process commands.

Command Security is Enhanced Via Encryption.

By using encryption based on the group membership, commands which are sent to computing resources cannot be interpreted or forged by malicious users.

Figure 4C:
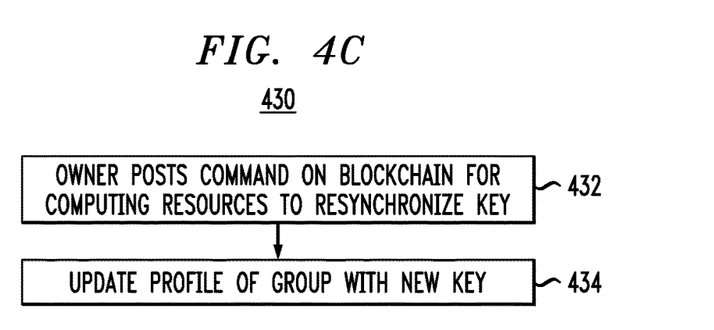

As shown in process 430 of FIG. 4C, if the group encryption key is ever compromised (or just to rotate the key for security purposes), the key itself can be updated by posting (step 432) a command on the blockchain for computing resources to resynchronize the key, and updating (step 434) the profile of the group with the new key (encrypted with the private key of the group and the public key of the affected computing resources). Alternatively, steps 432 and 434 can be done in reverse order. All commands issued can include a blockchain offset (the offset of when the resynchronization was posted) so computing resources unambiguously know to use the old or the new encryption key.

Prevention Support for Rogue Computing Resources.

If a rogue computing resource attempted to post an update on the blockchain, it would not be able to encrypt/sign it properly without access to the encryption key for the group. Ultimately, access to the encryption key is dependent on knowing the private key of the group. Assuming that proper security measures are taken with this private key, this is sufficient to prevent rogue computing resources from issuing incorrect management commands.

Figure 4D:
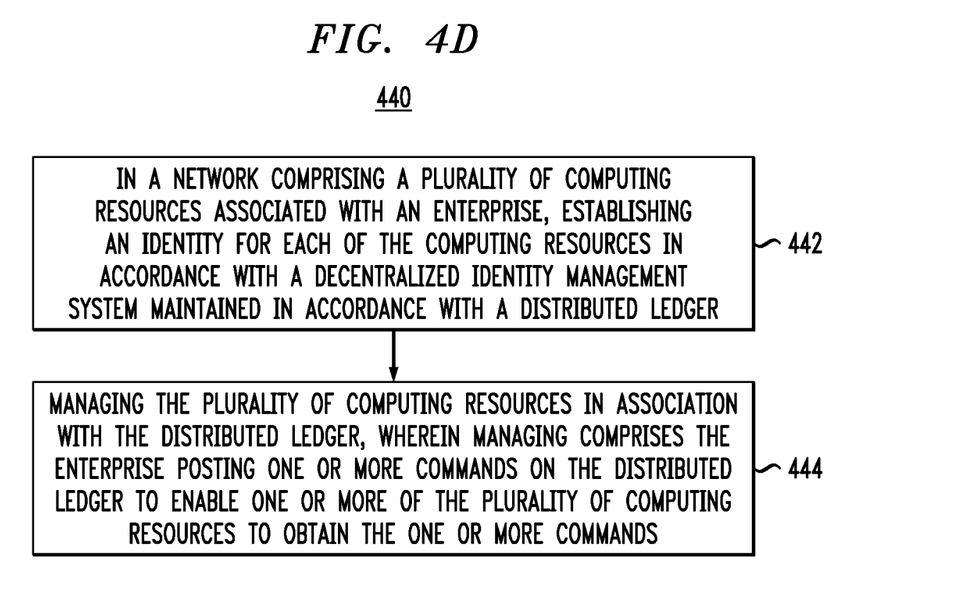

Given the illustrative description of decentralized computing resource management techniques herein, FIG. 4D depicts a methodology 440 for utilizing decentralized identity management system for managing a plurality of computing resources, according to an illustrative embodiment.

In a network comprising a plurality of computing resources associated with an enterprise, step 442 establishes an identity for each of the computing resources in accordance with a decentralized identity management system maintained in accordance with a distributed ledger.

In step 444, the plurality of computing resources is managed in association with the distributed ledger, wherein managing comprises the enterprise posting one or more commands on the distributed ledger to enable one or more of the plurality of computing resources to obtain the one or more command.

At least portions of the system for decentralized computing resource management shown in FIGS. 1-4 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 5.

As is apparent from the above, one or more of the processing modules or other components of the system for decentralized computing resource management shown in FIGS. 1-4 may each run on a computer, server, storage device or other processing platform element. A given such element may be viewed as an example of what is more generally referred to herein as a "processing device." An example of such a processing platform is processing platform 500 shown in FIG. 5.

Figure 5:
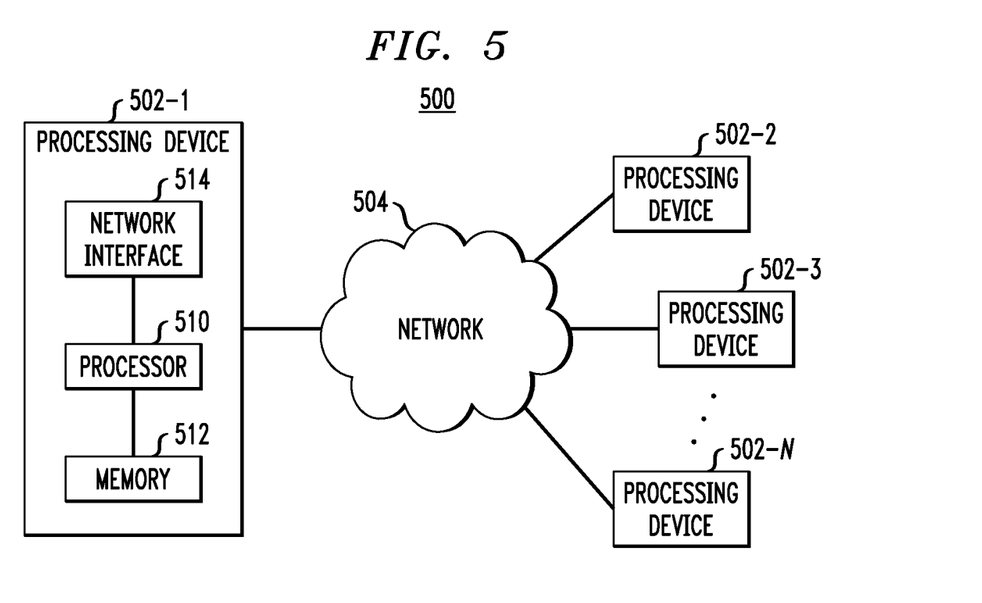
FIG. 5 illustrates a processing platform used to implement a decentralized identity management system for managing a plurality of computing resources, according to an illustrative embodiment.

The processing platform 500 in this embodiment comprises a plurality of processing devices, denoted 502-1, 502-2, 502-3, . . . 502-N, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 of the example embodiment of FIG. 5 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system for decentralized computing resource management, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a value-based governance system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system for decentralized computing resource management. Such components can communicate with other elements of the system over any type of network or other communication media.

As indicated previously, in some embodiments, components of the system for decentralized computing resource management as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems for decentralized computing resource management. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
   in a network comprising a plurality of computing resources associated with an enterprise, establishing an identity for each of the computing resources in accordance with a decentralized identity management system maintained in accordance with a distributed ledger; and
   managing the plurality of computing resources in association with the distributed ledger, wherein managing comprises the enterprise posting one or more commands on the distributed ledger to enable one or more of the plurality of computing resources to obtain the one or more commands;
   wherein one or more of the computing resources belong to at least one group specified by the enterprise to enable the enterprise to manage the at least one group via the one or more posted commands;
   wherein the at least one group has an encryption key associated therewith;
   wherein the enterprise publishes the encryption key in an identity profile established with the decentralized identity management system, and wherein the encryption key is encrypted with a private key of the at least one group and with a public key of a given one of the computing resources in the at least one group;
   wherein the managing step further comprises, before posting the one or more commands, encrypting the one or more commands with the encryption key associated with the group;
   wherein the managing step further comprises posting a plain-text message with the one or more encrypted commands to indicate to the one or more computing resources belonging to the at least one group that the one or more encrypted commands affect the one or more computing resources of the at least one group;
   wherein the method is implemented via one or more processing devices each comprising a processor coupled to a memory.

2. The method of claim 1, wherein the encryption key associated with the at least one group comprises a private key.

3. The method of claim 1, wherein the one or more computing resources belonging to the at least one group decrypt the one or more commands.

4. The method of claim 3, wherein the one or more computing resources belonging to the at least one group process the one or more commands.

5. The method of claim 4, wherein processing the one or more commands, for a given one of the one or more computing resources, further comprises storing at least a portion of the one or more commands or status information associated with the one or more commands in an identity profile of the given computing resource.

6. The method of claim 1, wherein the managing step further comprises updating the encryption key for the at least one group.

7. The method of claim 6, wherein the updating step further comprises posting a command on the distributed ledger to the at least one group to resynchronize the encryption key.

8. The method of claim 7, wherein the command to resynchronize the encryption key further comprises a distributed ledger offset.

9. The method of claim 1, wherein the network comprises a public network.

10. The method of claim 1, wherein a time to create the one or more commands and post the one or more commands on the distributed ledger is independent of a number of the plurality of computing resources and a number of the plurality of computing resources affected by the one or more commands.

11. The method of claim 1, wherein, for a subset of the plurality of computing resources that intermittently connect to the distributed ledger, a node representing the subset of computing resources, upon the node connecting to the distributed ledger, obtains the one or more commands from the distributed ledger and provides the one or more commands to the subset of computing resources.

12. The method of claim 1, wherein the managing step further comprises a given one of the plurality of computing resources reporting command processing results together with a distributed ledger offset of a last set of processed commands.

13. The method of claim 1, wherein the decentralized identity management system is adapted from a blockstack-based system and the distributed ledger is a blockchain distributed ledger.

14. A system comprising:
   one or more processing devices configured to:
   in a network comprising a plurality of computing resources associated with an enterprise, establish an identity for each of the computing resources in accordance with a decentralized identity management system maintained in accordance with a distributed ledger; and manage the plurality of computing resources in association with the distributed ledger, wherein managing comprises the enterprise posting one or more commands on the distributed ledger to enable one or more of the plurality of computing resources to obtain the one or more commands;

wherein one or more of the computing resources belong to at least one group specified by the enterprise to enable the enterprise to manage the at least one group via the one or more posted commands;

wherein the at least one group has an encryption key associated therewith;

wherein the enterprise publishes the encryption key in an identity profile established with the decentralized identity management system, and wherein the encryption key is encrypted with a private key of the at least one group and with a public key of a given one of the computing resources in the at least one group;

wherein the managing step further comprises, before posting the one or more commands, encrypting the one or more commands with the encryption key associated with the group;

wherein the managing step further comprises posting a plain-text message with the one or more encrypted commands to indicate to the one or more computing resources belonging to the at least one group that the one or more encrypted commands affect the one or more computing resources of the at least one group.

15. The system of claim 14, wherein the managing step further comprises updating the encryption key for the at least one group.

16. The system of claim 15, wherein the updating step further comprises posting a command on the distributed ledger to the at least one group to resynchronize the encryption key.

17. The system of claim 16, wherein the command to resynchronize the encryption key further comprises a distributed ledger offset.

18. An article of manufacture comprising a non-transitory processor-readable storage medium having stored therein program code of one or more software programs, wherein the program code when executed by at least one processing device causes said at least one processing device to:

in a network comprising a plurality of computing resources associated with an enterprise, establish an identity for each of the computing resources in accordance with a decentralized identity management system maintained in accordance with a distributed ledger; and manage the plurality of computing resources in association with the distributed ledger, wherein managing comprises the enterprise posting one or more commands on the distributed ledger to enable one or more of the plurality of computing resources to obtain the one or more commands;

wherein one or more of the computing resources belong to at least one group specified by the enterprise to enable the enterprise to manage the at least one group via the one or more posted commands;

wherein the at least one group has an encryption key associated therewith;

wherein the enterprise publishes the encryption key in an identity profile established with the decentralized identity management system, and wherein the encryption key is encrypted with a private key of the at least one group and with a public key of a given one of the computing resources in the at least one group;

wherein the managing step further comprises, before posting the one or more commands, encrypting the one or more commands with the encryption key associated with the group;

wherein the managing step further comprises posting a plain-text message with the one or more encrypted commands to indicate to the one or more computing resources belonging to the at least one group that the one or more encrypted commands affect the one or more computing resources of the at least one group.

19. The article of manufacture of claim 18, wherein the managing step further comprises updating the encryption key for the at least one group.

20. The article of manufacture of claim 19, wherein the updating step further comprises posting a command on the distributed ledger to the at least one group to resynchronize the encryption key.

* * * * *